United States Patent [19]

Kanzaka

[11] 4,397,061

[45] Aug. 9, 1983

[54] GROMMET FOR SETTING IN SHEET MATERIAL

[75] Inventor: Yoshihiro Kanzaka, Nyuzen, Japan

[73] Assignee: Yoshida Kogyo K.K., Tokyo, Japan

[21] Appl. No.: 233,165

[22] Filed: Feb. 10, 1981

[30] Foreign Application Priority Data

Feb. 29, 1980 [JP] Japan ............................ 55-26893[U]

[51] Int. Cl.³ .............................................. A43C 5/00
[52] U.S. Cl. ............................................ 16/2; 24/141
[58] Field of Search ...................... 16/2; 24/141, 142; 174/65 G, 152 G, 153 G

[56] References Cited

U.S. PATENT DOCUMENTS

| 913,024 | 2/1909 | Meacham ........................ 174/153 G |
| 1,010,592 | 12/1911 | Cole ............................ 174/153 G X |
| 2,495,252 | 1/1950 | Hansen, Sr. et al. ................. 16/2 X |
| 3,887,960 | 6/1975 | Sherman ................................. 16/2 |

FOREIGN PATENT DOCUMENTS

| 1041750 | 10/1958 | Fed. Rep. of Germany ... 174/153 G |
| 2812510 | 10/1979 | Fed. Rep. of Germany ............ 16/2 |
| 49-145809 | 12/1974 | Japan . |

Primary Examiner—Fred Silverberg
Attorney, Agent, or Firm—Robert E. Burns; Emmanuel J. Lobato; Bruce L. Adams

[57] ABSTRACT

A grommet includes an eyelet and a washer both of rigid plastics which are matable together so as to be set in a fabric or sheet material. The eyelet has a barrel having on one end thereof an annular locking flange projecting radially outwardly and an annular recess 16 adjacent to the locking flange 14. The washer has an annular rib and a plurality of locking tongues projecting radially inwardly from the annular rib. When the eyelet and the washer are coaxially combined with each other with the fabric or sheet material sandwiched therebetween, the locking tongues are snapped over the locking flange into the annular recess. The washer is now retained or trapped on the barrel by the locking flange against removal.

8 Claims, 7 Drawing Figures

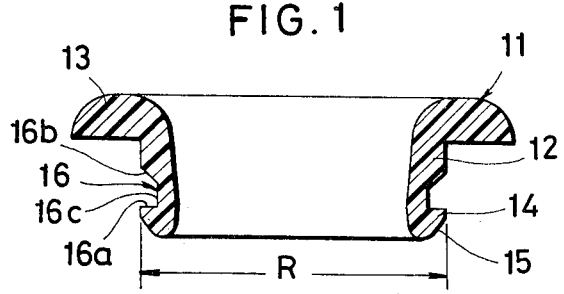
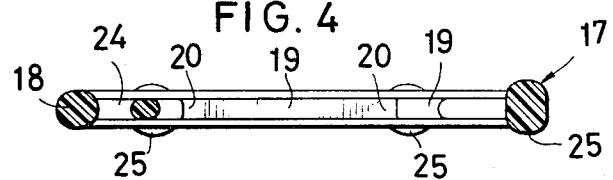
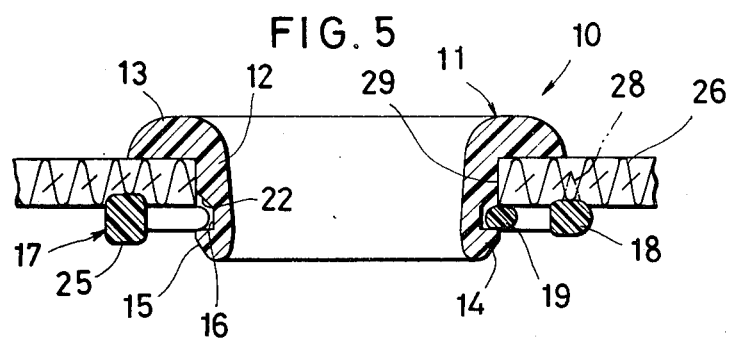
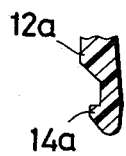

GROMMET FOR SETTING IN SHEET MATERIAL

BACKGROUND OF THE INVENTION

1. Field of the Invention

The present invention relates to a grommet of plastics material composed of parts which can be snapped together.

2. Prior Art

There have heretofore been known and used various grommets made of metal or plastics for setting in sheet material such as fabrics as of hats. One typical form of grommet that is illustrated in FIG. 7 of the accompanying drawings comprises an eyelet and a washer which are assembled together by staking the eyelet end on the washer with the fabric therebetween. The staked eyelet end is curled or deformed to such an extent that cracks are formed therein which will catch hairs of the wearer of the hat in which the grommet is set and, where the eyelet is made of metal, will assist the eyelet in getting corroded.

An attempt to avoid such cracks in plastics grommets would be to bond the eyelet and the washer together by application of heat or ultrasonic vibration. Such bonding technique however necessitates special equipment and hence results in a complex assembling procedure.

Japanese Utility Model Laid-Open Publication No. 49-145809 published on Dec. 17, 1974 discloses a grommet of plastics material comprising male and female members snappable together. However, an undue amount of force is required to combine the two members together and one or both of the members tend to crack or be deformed since the interfitting edges are angularly shaped and the female member is too rigid to be smoothly snapped on the male member.

SUMMARY OF THE INVENTION

An eyelet of rigid plastics has an annular locking flange projecting radially outwardly from one end of a barrel and an annular recess adjacent to the locking flange. A circular washer of rigid plastics has an annular rib and a plurality of angularly spaced tongues projecting radially inwardly from the annular rib. The eyelet and the washer are mated together into a grommet by bringing the washer coaxially into fitting engagement with the eyelet, with the locking tongues being snapped over the locking flange into the annular recess. The grommet is thus set in a fabric and retained therein by the washer trapped on the barrel by the locking flange.

It is an object of the present invention to provide a grommet which can easily be attached to sheet material without the need for any attachment tool.

Another object of the present invention is to provide a grommet which has parts snappable together so as to be set in sheet material without being permanently bent or deformed.

The above and other objects, features and advantages of the present invention will become apparent from the following description when taken in conjunction with the accompanying drawings.

BRIEF DESCRIPTION OF THE DRAWINGS

FIG. 1 is a vertical cross-sectional view of an eyelet;

FIG. 4 is a cross-sectional view taken along line IV—IV of FIG. 3;

FIG. 5 is a vertical cross-sectional view of an assembled grommet set in fabric, the grommet comprising the eyelet and the washer;

FIG. 6 is a fragmentary cross-sectional view of a modified eyelet; and

FIG. 7 is a vertical cross-sectional view of a conventional grommet.

DETAILED DESCRIPTION

Figure 2:
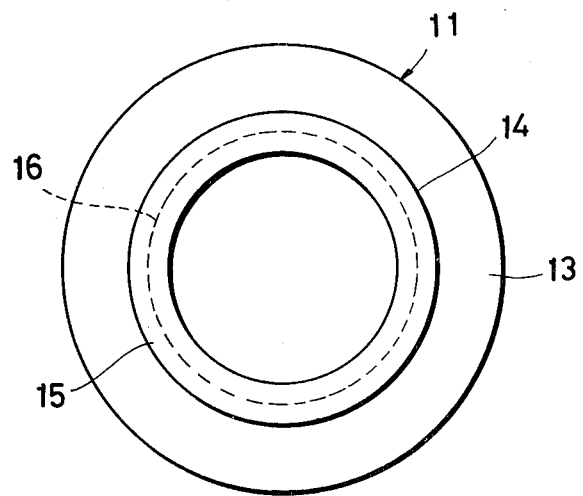
FIG. 2 is a bottom view of the eyelet shown in FIG. 1.
Figure 3:
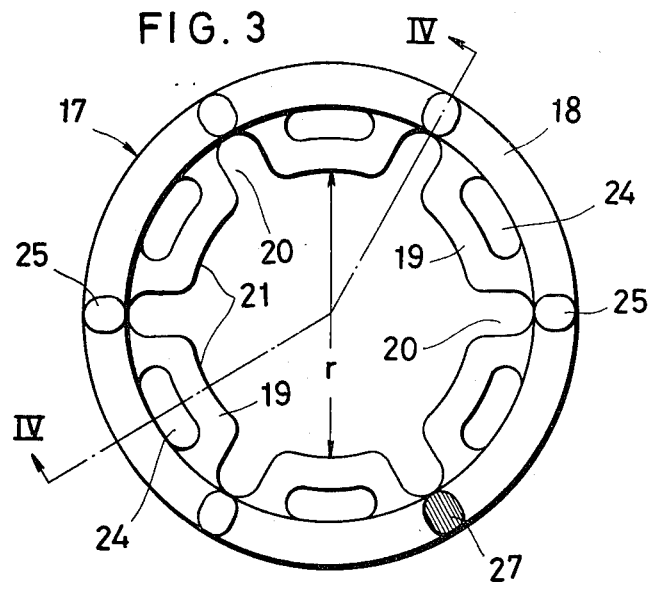
FIG. 3 is a plan view of a washer.

As shown in FIGS. 1 and 2, a grommet 10 (FIG. 5) for setting in a fabric such as of a hat includes an eyelet 11 made of rigid plastics such as nylon. The eyelet 11 includes a barrel 12 having on one end thereof an annular flange 13 which is to be retained on a face side of sheet material in which the grommet is to be set. The barrel 12 has an annular recess 16 opening radially outwardly and defined by a radial surface 16a, a slant 16b spaced axially from the radial surface 16a in confronting relation, and an axial peripheral bottom surface 16c extending between the radial surface 16a and the slant 16b. With the annular recess 16, an annular locking flange 14 is defined on the other end of the barrel 12, the flange 14 projecting radially outwardly and having an annular beveled or tapered surface 15 facing away from the flange 13. Thus, the annular locking flange 14 is located immediately below (as shown in FIG. 1) the annular recess 16. The annular locking flange 14 has an outside diameter R which is the same as that of the remainder of the barrel 12.

The grommet 10 also includes a circular washer 17 made likewise of rigid plastics which has an annular rib 18 and a plurality (six in the illustrated embodiment) of locking tongues 19 projecting radially inwardly from the annular rib 18 and angularly spaced from each other with a plurality of radial grooves 20 therebetween. The angularly spaced locking tongues 19 with the radial grooves 20 therebetween are rendered more flexible for easy snapping action than would be the case if the locking tongues 19 were integral with each other. The locking tongues 19 have arcuate inner peripheral edges 21 which jointly define a circle having a diameter r that is slightly smaller than the outside diameter R of the locking flange 14, so that the inner peripheral edges 21 can be held against the tapered surface 15 of the locking flange 14 when the eyelet 11 and the washer 17 start being coaxially assembled together. As best illustrated in FIG. 4, the locking tongues 19 are thinner than the annular rib 18 so as to be resiliently flexible relatively to the latter. Each of the locking tongues 19 has an arcuate slot 24 extending adjacent to and along the annular rib 18, and serving to give the locking tongue 19 additional resilient flexibility. The annular rib 18 has a plurality of protuberances 25 that are angularly spaced preferably at equal intervals and positioned in radial alignment with the grooves 20 and that project axially of the washer 17. As shown in FIG. 6, an annular locking flange 14a may have an outside diameter smaller than that of a barrel 12a.

For assembly of the grommet 10, the barrel 12 of the eyelet 10 is inserted into a hole 29 in a fabric 26 until the flange 13 is held against the face of the fabric 26. The hole 29 is so sized that the barrel 12 snugly fits in the hole 29 without being wobbled sideways. Since the annular locking flange 14 is diametrically the same as or smaller than the remainder of the barrel 12, the annular locking flange 14 goes smoothly through the hole 29.

The circular edge of the fabric 26 defining the hole 29 may get caught in the annular recess 16 due to frictional forces. However, the slant 16b serves to assist the fabric edge into escaping out of the recess 16. Then, the washer 17 is fitted onto the barrel 12 in coaxial relation at the back of the fabric 26. More specifically, when the washer 17 starts engaging the eyelet 11, the inner peripheral edges 21 are first brought into contact with the tapered surface 15. The washer 17 is forced axially toward the fabric 26 as the locking tongues 19 are caused to flex by the locking flanges 14. Continued forced movement of the washer 17 causes the locking tongues 19 to be snapped over the locking flange 14 into the annular recess 16 between the fabric 26 and the flange 14. At this time, the washer 17 is normally pushed forcibly against the fabric 26 to enable the locking tongues 19 to move flexingly past the annular locking flange 14. When the locking tongues 19 are snapped beyond the locking flange 14, they tend to go past the recess 16 onto the barrel 12 under their own resiliency. However, the slant 16b allows the locking tongues 19 to return therealong back into the annular recess 16. The washer 17 thus assembled on the eyelet 11 is retained or trapped in position by the locking flange 14 against accidental removal unless efforts are made to pry off the washer 17. The protuberances 25 bite into the fabric 26 to fasten the fabric 26 securely between the flange 13 and the washer 17. As a result, the grommet 10 is retained firmly on the fabric 26 against rotation about its own axis. At least one of the protuberances 25 may have on its top ridges 27 extending radially of the washer 17. With the ridges 27 held against the fabric 26, the washer 17 is more effectively prevented from moving about due to increased frictional resistance between the fabric 26 and the protuberance 25. The annular rib 17 may have a pointed projection 28 (FIG. 5) extending in an axial direction of the washer 17. When the grommet 10 is set in the fabric 26, the projection 28 penetrates the fabric 26 to prevent relative rotative movement between the grommet 11 and the fabric 26.

Although a certain preferred embodiment has been shown and described in detail, it should be understood that various changes and modifications may be made therein without departing from the scope of the appended claims.

What is claimed is:

1. A grommet for setting in sheet material, comprising:
   (a) an eyelet of rigid plastic material including a barrel having an annular retaining flange at one end of the barrel, an annular locking flange disposed at an opposite end of the barrel, an annular recess adjacent said locking flange, and a barrel portion between said annular recess and said retaining flange, said annular locking flange having an outside diameter which is the same as or smaller than that of said barrel portion; and
   (b) a washer of rigid plastic material including an annular rib and a plurality of locking tongues projecting radially inwardly from said annular rib, said locking tongues of said washer jointly defining an interrupted circular edge having a diameter smaller than said outside diameter of said locking flange, said locking tongues being snappable over said locking flange into said annular recess at a position between the sheet material and said locking flange to retain said eyelet in said sheet material said locking tongues having slots therein.

2. A grommet according to claim 1, said annular recess opening radially outwardly and defined by a radial surface of said annular locking flange, a slant axially spaced from said radial surface in confronting relation, and an axial peripheral bottom surface extending between said radial surface and said slant.

3. A grommet according to claim 1, said annular rib having a plurality of protuberances projecting in an axial direction.

4. A grommet according to claim 3, at least one of said protuberances having ridges extending radially of said washer.

5. A grommet according to claim 1, said annular rib having a pointed projection extending in an axial direction.

6. A grommet according to claim 1, said tongues being angularly spaced from each other with radial grooves defined therebetween.

7. A grommet according to claim 1, said slots being arcuate and extending along said annular rib.

8. A grommet according to claim 1, said annular locking flange having an annular tapered surface with which said locking flanges are engageable before said locking tongues are snapped into said recess.

* * * * *